(12) United States Patent
Miki et al.

(10) Patent No.: US 10,894,671 B2
(45) Date of Patent: Jan. 19, 2021

(54) POWDER CONVEYING SYSTEM

(71) Applicant: TOYOTA JIDOSHA KABUSHIKI KAISHA, Toyota (JP)

(72) Inventors: Nariaki Miki, Okazaki (JP); Kazuki Muraishi, Toyota (JP); Sachie Akiba, Toyota (JP); Kengo Matsuo, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/553,907

(22) Filed: Aug. 28, 2019

(65) Prior Publication Data
US 2020/0071087 A1 Mar. 5, 2020

(30) Foreign Application Priority Data

Sep. 3, 2018 (JP) .................................. 2018-164536

(51) Int. Cl.
| | | |
|---|---|---|
| *B65G 43/08* | (2006.01) | |
| *B65G 53/52* | (2006.01) | |
| *B65G 53/04* | (2006.01) | |
| *B65G 33/14* | (2006.01) | |
| *H01M 4/04* | (2006.01) | |

(52) U.S. Cl.
CPC ............. *B65G 43/08* (2013.01); *B65G 33/14* (2013.01); *B65G 53/04* (2013.01); *B65G 53/526* (2013.01); *H01M 4/0471* (2013.01); *B65G 2201/042* (2013.01); *B65G 2203/0208* (2013.01); *B65G 2203/042* (2013.01); *H01M 4/0419* (2013.01)

(58) Field of Classification Search
CPC .......... F26B 21/08; F26B 21/10; B65G 43/08; B65G 53/526; B65G 53/04; B65G 33/14; B65G 2203/0208; B65G 2201/042; B65G 2203/042; H01M 4/0471; H01M 4/0419; H01M 4/366; H01M 4/505; H01M 4/525; H01M 4/485; H01M 4/139; H01M 4/043; H01M 10/04; Y02E 60/10
See application file for complete search history.

(56) References Cited

U.S. PATENT DOCUMENTS

| | | | |
|---|---|---|---|
| 5,156,498 A | | 10/1992 | Nomura et al. |
| 5,260,033 A | * | 11/1993 | Tarancon ............... B01J 8/0015 366/324 |
| 2016/0079634 A1 | | 3/2016 | Onodera et al. |

FOREIGN PATENT DOCUMENTS

| | | |
|---|---|---|
| JP | 2647726 B2 | 8/1997 |
| JP | 2008-293970 A | 12/2008 |
| JP | 2011-124028 A | 6/2011 |
| JP | 2013-203485 A | 10/2013 |
| JP | 2016-058335 A | 4/2016 |

* cited by examiner

*Primary Examiner* — Jessica Yuen
(74) *Attorney, Agent, or Firm* — Sughrue Mion, PLLC

(57) ABSTRACT

Provided is a powder conveying system configured to prevent moisture adsorption to powder during powder conveyance. The powder conveying system comprises: a conveying path, a conveying device wherein the conveying device is a part of the conveying path or is connected with the conveying path; a measuring device wherein the measuring device is a part of the conveying path or is connected with the conveying path; a controlling device wherein the controlling device is a part of the conveying path or is connected with the conveying path; and a judging device wherein the judging device is connected with the measuring device and the controlling device.

4 Claims, 4 Drawing Sheets

US 10,894,671 B2

POWDER CONVEYING SYSTEM

TECHNICAL FIELD

The disclosure relates to a powder conveying system.

BACKGROUND

Many battery materials are reactive with moisture and with the components of air (hereinafter, they will be referred to as "moisture, etc.") Especially, powders for battery materials are more reactive with moisture, etc., since many of them have a large specific surface area compared to battery materials in other forms. Many powders for battery materials cause material deterioration due to a reaction with moisture, etc. Accordingly, during their conveyance, it is essential to avoid contact with moisture, etc.

In Patent Literature 1, there is a description of a method for manufacturing an all-solid-state battery, the method including a step of, when forming each electrode material layer by spraying a mixed powder material of an active material and a solid electrolyte to the surface of a current collector by a conveyance gas, charging electric charges on the mixed powder material and spraying the charged mixed powder material. Patent Literature 1 describes that moisture is removed from the mixed powder material by use of an inert gas with a dew point of −80° C. or less as the conveyance gas, whereby the mixed powder material is prevented from reaction with moisture, and a decrease in the battery performance is prevented.

Patent Literature 1: Japanese Patent Application Laid-Open (JP-A) No. 2011-124028

However, the all-solid-state battery production method as disclosed in Patent Literature 1 faces a problem of high production cost, since the production method requires a facility to control the dew point of the conveyance gas to −80° C. or less.

SUMMARY

In light of the above circumstance, an object of the disclosed embodiments is to provide a powder conveying system configured to prevent moisture adsorption to powder.

In a first embodiment, there is provided a powder conveying system comprising: a conveying path, a conveying device wherein the conveying device is a part of the conveying path or is connected with the conveying path, and the conveying device is configured to convey a powder in the conveying path; a measuring device wherein the measuring device is a part of the conveying path or is connected with the conveying path, and the measuring device is configured to measure a temperature and dew point of the conveying path; a controlling device wherein the controlling device is a part of the conveying path or is connected with the conveying path, and the controlling device is configured to control at least one of the temperature and dew point of the conveying path; and a judging device wherein the judging device is connected with the measuring device and the controlling device; the judging device is configured to obtain, based on the dew point of the conveying path measured by the measuring device, a critical temperature at which a released moisture amount of the powder is 0; the judging device is configured to compare the temperature of the conveying path measured by the measuring device to the critical temperature; the judging device is configured to keep the temperature and dew point of the conveying path by the controlling device when the temperature of the conveying path is equal to or more than the critical temperature; and the judging device is configured to carry out at least one of heating the conveying path by the controlling device and decreasing the dew point of the conveying path by the controlling device, when the temperature of the conveying path is less than the critical temperature.

The critical temperature obtained by the judging device may be from 40° C. to 55° C. when the dew point of the conveying path is from −10° C. to 10° C.

The critical temperature obtained by the judging device may be from 15° C. to 30° C. when the dew point of the conveying path is from −50° C. to −30° C.

The powder may be a powder for battery materials.

According to the disclosed embodiments, the judging device judges whether or not to carry out heating the conveying path and/or decreasing the dew point of the conveying path, using as a reference the critical temperature at which the released moisture amount of the powder is 0. Accordingly, moisture adsorption to the powder can be efficiently prevented during powder conveyance.

BRIEF DESCRIPTION OF THE DRAWINGS

In the accompanying drawings.

DETAILED DESCRIPTION

Figure 1:
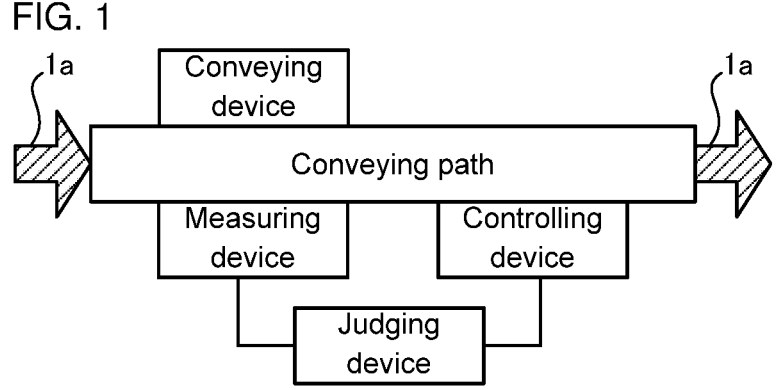
FIG. 1 is a schematic view of an embodiment of the powder conveying system of the disclosed embodiments.

The powder conveying system of the disclosed embodiments is a powder conveying system comprising: a conveying path, a conveying device wherein the conveying device is a part of the conveying path or is connected with the conveying path, and the conveying device is configured to convey a powder in the conveying path; a measuring device wherein the measuring device is a part of the conveying path or is connected with the conveying path, and the measuring device is configured to measure a temperature and dew point of the conveying path; a controlling device wherein the controlling device is a part of the conveying path or is connected with the conveying path, and the controlling device is configured to control at least one of the temperature and dew point of the conveying path; and a judging device wherein the judging device is connected with the measuring device and the controlling device; the judging device is configured to obtain, based on the dew point of the conveying path measured by the measuring device, a critical temperature at which a released moisture amount of the powder is 0; the judging device is configured to compare the temperature of the conveying path measured by the measuring device to the critical temperature; the judging device is configured to keep the temperature and dew point of the conveying path by the controlling device when the temperature of the conveying path is equal to or more than the critical temperature; and the judging device is configured to carry out at least one of heating the conveying path by the controlling device and decreasing the dew point of the conveying path by the controlling device, when the temperature of the conveying path is less than the critical temperature.

In general, powder has a large surface area relative to its mass. Accordingly, it is brought into frequent contact with moisture, etc., and thus it is susceptible to moisture, etc. Accordingly, powder conveyance is generally carried out by gas conveyance using gas with a low moisture content (i.e., dry gas), inert gas, etc. However, in the case of using dry gas, inert gas, etc., (hereinafter, they may be collectively referred to as "dry gas, etc."), an equipment for producing and supplying device of dry gas, etc., is needed. Moreover, a high-cost facility is needed to ensure airtightness of the powder conveying path.

The powder conveying system of the disclosed embodiments is based on the above problems. The powder conveying system of the disclosed embodiments is a powder conveying system configured to efficiently suppress moisture adsorption to powder by controlling the temperature and/or dew point of the conveying path.

The powder conveying system of the disclosed embodiments comprises (1) the conveying path, (2) the conveying device, (3) the measuring device, (4) the controlling device and (5) the judging device. However, the components constituting the powder conveying system of the disclosed embodiments are not limited to these five components.

FIG. 1 is a schematic view of an embodiment of the powder conveying system of the disclosed embodiments. Rectangles shown in FIG. 1 indicate the above-mentioned five components. The schematic view is merely used to illustrate the powder conveying system of the disclosed embodiments, and the powder conveying system of the disclosed embodiments is not limited by the schematic view.

Two arrows 1a are shown in FIG. 1. As indicated by the arrows 1a, the conveying path conveys the powder in a given direction. With the conveying path, the conveying device, the measuring device and the controlling device are connected. As shown in FIG. 1, the conveying device, the measuring device and the controlling device may be separately connected with the conveying path, or unlike FIG. 1, they may be a part of the conveying path. As will be described below, the conveying device carries out powder conveyance in the conveying path; the measuring device measures the temperature and dew point of the conveying path; and the controlling device controls the temperature and/or dew point of the conveying path. The judging device is connected with the measuring device and the controlling device. As will be described below, the judging device makes a judgment based on the measurement result made by the measuring device, and the judging device sends the judgment result to the controlling device.

As shown in FIG. 1, it is not needed to connect the conveying device and the judging device with each other. When they are not connected with each other, powder conveyance is carried out independently from control of the temperature and/or dew point. The conveying device and the judging device may be connected with each other, unlike FIG. 1. In this case, powder conveyance and control of the temperature and/or dew point may be coordinated with each other. For example, the amount of the conveyed powder and the conveyance rate of the powder may be controlled based on the temperature and/or dew point of the conveying path.

Hereinafter, the five main components will be described in order, followed by two typical examples of the powder conveying system of the disclosed embodiments and an example of using the powder conveying system of the disclosed embodiments.

1. The Conveying Path

The powder conveying system of the disclosed embodiments comprises the conveying path configured to convey a powder.

In the disclosed embodiments, "powder" means an aggregation of discrete particles. The discrete particles include general powders and grains. The particle diameters of the particles of the powder may be uniform or differ. The particle diameter of the particles of the powder is not particularly limited. For example, it may be from 0.1 µm to 1 mm. The particles contained in the powder may be particles of the same material, or they may be a mixture of particles of two or more kinds of materials.

The powder conveyed by the powder conveying system of the disclosed embodiments is not particularly limited, as long as it is a powder that can be conveyed by the below-described conveying device. As the powder conveyed by the powder conveying system, examples include, but are not limited to, powders for battery materials, such as an electrode active material powder and a solid electrolyte powder; food powders such as flour and bread crumbs; powders used in medicines such as tablets for medicines, granules for medicines, and powders for medicines.

In the disclosed embodiments, the powder conveyed by the powder conveying system may be a powder for battery materials. The battery materials mean both a liquid-based battery material and a solid battery material. In the disclosed embodiments, the powder conveyed by the powder conveying system may be a powder for solid battery materials.

As described above, as the powder for battery materials, examples include, but are not limited to, an electrode active material powder and a solid electrolyte powder. As the electrode active material powder, examples include, but are not limited to, a coated active material powder described below.

An example of the synthesis of the coated active material powder will be described below. The coated active material powder is not limited to the following synthesis example.

A peroxo complex solution is prepared as follows, which is used for coating. First, ammonia water is added to a mixed aqueous solution of a niobate trihydrate ($Nb_2O_5 \cdot 3H_2O$) and hydrogen peroxide solution. They are mixed to obtain a clear aqueous solution. A lithium hydroxide monohydrate ($LiOH \cdot H_2O$) is added to the clear aqueous solution, thereby obtaining the peroxo complex solution.

Next, using the peroxo complex solution, an active material is coated and heated as follows.

The peroxo complex solution is sprayed to a cathode active material ($LiNiMnCoO_2$) by a coating equipment, thereby coating the cathode active material with the complex.

After spraying the peroxo complex solution for a predetermined spraying time, a mixture thus formed is removed from the coating equipment and then appropriately subjected to a post-treatment, thereby obtaining the coated active material powder.

If the coated active material powder as described above is exposed to the air in a battery production process, the performance of a battery thus obtained may be deteriorate. The reason is as follows.

Depending on the type of the coated active material powder, there is a possibility that when exposed to the air, the coated active material powder reacts with carbon dioxide and moisture in the air, thereby producing lithium carbonate. The lithium carbonate may form a resistive coating layer on the surface of the coated active material powder and may result in a deterioration in the performance of the battery thus obtained.

In general, the powder for battery materials like the above-described coated active material powder readily reacts with moisture, etc. Especially, once the powder for battery materials is deteriorated by moisture in the air, it may seriously impair the performance of the thus-obtained battery. Accordingly, in the battery production process, it is needed to suppress moisture adsorption to the powder for battery materials. Since moisture adsorption to the powder for battery materials is likely to occur especially during powder conveyance, it can be said that a low-cost and simple method for conveying the powder for battery materials is essential for the production of a high-performance battery. The powder conveying system configured to avoid moisture adsorption, can prevent moisture adsorption to the powder for battery materials during powder conveyance, and can suppress a decrease in the properties (e.g., ion conductivity) of the powder for battery materials which is susceptible to moisture. Accordingly, the powder conveying system contributes to the production of a high-performance battery material and the production of a high-performance battery using the battery material.

In the disclosed embodiments, "powder conveyance" means transporting the powder from one place to another place. "Powder conveyance" is not particularly limited, as long as it is an action including moving the position of the powder. For example, "powder conveyance" includes transporting and moving the powder from one container to another container, and removing the powder in a container to the outside of the container. Especially, removing the powder in the container to the outside of the container, includes removing the powder from the inside of the container and spraying the removed powder to a given substrate.

The conveying path may be a conveying tube in which the powder conveyed by the powder conveying system is enclosed, or it may be a conveying path that conveys the powder without enclosing the powder therein. As the conveying tube, examples include, but are not limited to, conveying tubes shown in FIGS. 2 and 3, which are conveying tubes with a built-in heater. As the conveying path that conveys the powder without enclosing the powder therein, examples include, but are not limited to, a belt conveyor on which the powder is placed. In the case of employing the conveying path that conveys the powder without enclosing the powder therein, from the viewpoint of avoiding moisture adsorption, the whole powder conveying system of the disclosed embodiments may be placed in a dry room.

2. The Conveying Device

The powder conveying system of the disclosed embodiments comprises the conveying device configured to convey the powder in the conveying path.

The conveying device is not particularly limited, as long as it is a device configured to fulfill a powder conveying function in the conveying path. The conveying device may be a conventionally-known device. The conveying device may be a part of the conveying path, or it may be connected with the conveying path. When the conveying device is a part of the conveying path, as the conveying device, examples include, but are not limited to, the above-mentioned belt conveyor, a screw conveyor as described below, which is disposed inside the conveying path, a bucket conveyor and an apron conveyor. As the conveying device connected with the conveying path, examples include, but are not limited to, an air pump and a vacuum conveyor, both of which will be described below. The conveying device may be one of the devices, or it may be a combination of two or more of the devices.

The controlling device described below may be connected with the conveying device. Especially, the controlling device may be connected with the screw conveyor disposed inside the conveying path, etc., and the temperature, etc., of the screw conveyor, etc., may be controlled by the controlling device.

3. The Measuring Device

The powder conveying system of the disclosed embodiments comprises the measuring device configured to measure the temperature and dew point of the conveying path.

The measuring device is not particularly limited, as long as it is a device configured to measure the temperature and dew point of the conveying path. The measuring device may be a conventionally-known device. In the disclosed embodiments, "measure the temperature and dew point of the conveying path" means the following. In the case of using, as the conveying path, the conveying tube in which the powder conveyed by the powder conveying system is enclosed, the measuring device measures the temperature and dew point of the inside of the conveying path. In the case of using, as the conveying path, the conveying path that conveys the powder without enclosing the powder therein, the measuring device measures the temperature of an area at which the conveying path is in contact with the powder, and the dew point near the area.

The measuring device may be a part of the conveying path, or it may be connected with the conveying path. When the measuring device is a part of the conveying path, as the measuring device, examples include, but are not limited to, a thermometer, a dew point meter, etc., which are built into the conveying path. As the measuring device connected with the conveying path, examples include, but are not limited to, a thermometer, a dew point meter, etc., which are connected with the conveying path from the outside.

4. The Controlling Device

The powder conveying system of the disclosed embodiments comprises the controlling device configured to control at least one of the temperature and dew point of the conveying path.

The controlling device is not particularly limited, as long as it is a device configured to control the temperature and/or dew point of the conveying path. The controlling device may be a conventionally-known device. The controlling device may be a part of the conveying path, or it may be connected with the conveying path. When the controlling device is a part of the conveying path, as the controlling device, examples include, but are not limited to, a heater, a dry air pump, etc., which are built into the conveying path. As the controlling device connected with the conveying path, examples include, but are not limited to, a heater, a dry air pump, etc., which are connected with the conveying path from the outside. The dew point of the conveying path may be decreased by using the air pump, which is an example of the conveying device, and decreasing the humidity of the air supplied from the air pump.

As the temperature of the conveying path increases (or as the dew point of the conveying path decreases), less water adsorbs to the powder. Accordingly, in the disclosed embodiments, the controlling device may be a device configured to increase the temperature of the conveying path or a device configured to decrease dew point of the conveying path, or it may be a device having both the two functions.

5. The Judging Device

The powder conveying system of the disclosed embodiments comprises the judging device which is connected with both the measuring device and the controlling device and which has (1) a critical temperature deriving function and (2) a judging function.

(1) The Critical Temperature Deriving Function

The critical temperature deriving function of the judging device is a function to obtain, based on the dew point of the conveying path, the critical temperature at which the released moisture amount of the powder is 0. The dew point of the conveying path is measured by the measuring device with which the judging device is connected.

Once the type of the powder conveyed by the powder conveying system and the dew point of the conveying path are identified, the critical temperature is unambiguously obtained. Accordingly, the judging device may preliminarily memorize the value of the critical temperature by the type of the powder and the dew point of the conveying path, or the judging device may store a map for deriving the critical temperature value from the type of the powder and the dew point of the conveying path. For example, FIGS. 6A and 6B may be used as the data source of the map. That is, in the disclosed embodiments, deriving the critical temperature means obtaining the critical temperature value for comparison with the temperature of the conveying path. For example, it may be an action to call the critical temperature value from a memorizing device, etc., or it may be an action to allow the judging device itself to calculate the critical temperature value.

As the judging device connected with the measuring device and the controlling device, examples include, but are not limited to, measuring devices as shown below in "Examples", such as a temperature programmed desorption-mass spectrometer (TPD-MS) connected with the conveying path from the outside, and a thermogravimetry-mass spectrometer (TG-MS) connected with the conveying path from the outside.

Of the measuring devices, the TPD-MS can measure a substance that is released from the powder when heating the powder. Accordingly, a graph for obtaining the critical temperature can be obtained by measuring, with the TPD-MS, water molecules that are released by heating the powder. An example of the graph is FIG. 5, which will be described below in "Examples". From FIG. 5, it is revealed that the continuous moisture release behavior of a specific material at temperatures in a given range, is obtained by approximating, by a cubic curve, the released moisture amounts at heating temperatures, as the basis on which to obtain the critical temperature. Then, the temperature at which the moisture release behavior is 0 in the graph, is the derived critical temperature.

As the judging device connected with the measuring device and the controlling device, examples also include, but are not limited to, a memorizing device to store the critical temperature value and/or physical property data for obtaining the critical temperature value (hereinafter, they may be collectively referred to as "critical temperature value, etc.")

The critical temperature value, etc., may be associated with the value of the dew point of the conveying path and then preliminarily stored in the memorizing device. The number of the preliminarily-stored critical temperature value, etc., may be one or more. Or, one or more maps of the critical temperature value, etc., may be stored in the memorizing device, and the most appropriate map may be selected from the memorizing device depending on the dew point of the conveying path.

The critical temperature value, etc., may be a value resulting from measurement and calculation by an equipment disposed inside or outside the powder conveying system. In this case, the memorizing device may be connected with the measurement equipment.

The memorizing device may read new physical values that are sent back from the below-described judging device, etc., such as the temperature and dew point of the conveying path at a given stage, as factors for use in calculating the critical temperature value, etc. As just described, by keeping the physical values updated in this manner, data on temporal changes in the temperature and dew point of the conveying path, can be obtained.

As the equipment for memorizing the critical temperature value, etc., examples include, but are not limited to, semiconductor memory devices such as a memory for memorizing a predetermined critical temperature value, etc., magnetic storage devices such as a hard disk, and terminal devices having these devices built thereinto.

As the other device for measuring and calculating the critical temperature value inside or outside the powder conveying system, examples include, but are not limited to, a combination of a hot plate and a Karl Fischer water content meter. Details of the method for measuring and calculating the critical temperature value, are as follows.

First, at the same dew point as the dew point of the conveying path, the powder conveyed by the powder conveying system is heated on a hot plate. When the surface of the hot plate reaches a specific temperature (such as 100° C., 150° C. or 200° C.), the released moisture amount (ppm) of the powder is measured by a Karl Fischer water content meter. The released moisture amount (ppm) may be measured at different three to five temperatures. The thus-obtained data points are plotted on a graph and approximated by a cubic curve in the same manner as the above-described case of FIG. 5, thereby creating a graph quantitatively showing a relationship between the temperature (° C.) and the released moisture amount (ppm). As the graph, examples include, but are not limited to, FIGS. 6A and 6B that will be described below in "Examples". Also, the graph showing the relationship between the temperature and the released moisture amount may be created by continuously measuring the released moisture amount along with an increase in the temperature of the hot plate surface and continuously plotting the measurement results. The temperature (° C.) at which the released moisture amount is 0 ppm, is identified from the created graph, and the temperature is determined as the critical temperature value.

In the case of using the combination of the hot plate and the Karl Fischer water content meter, the measurement and calculation of the critical temperature value may be carried out concurrently with powder conveyance, or it may be preliminarily carried out before powder conveyance. When the measurement and calculation of the critical temperature value is carried out before powder conveyance, the thus-obtained critical temperature value data may be stored in the above-described memorizing device, and then necessary data may be called from the memorizing device at the time of powder conveyance.

The critical temperature obtained by the judging device may be from 40° C. to 55° C. when the dew point of the conveying path is from −10° C. to 10° C. The relationship between the dew point and the critical temperature depends on the powder conveyed by the powder conveying system.

Accordingly, for example, when the dew point of the conveying path is from −5° C. to 5° C., the critical temperature may be from 45° C. to 53° C. When the dew point of the conveying path is −4° C., the critical temperature may be 51° C. As the moisture release behavior showing such a relationship between the dew point and the critical temperature, examples include, but are not limited to, the date of FIG. 6A that will be described below in "Examples".

As an environment at a dew point of from −10° C. to 10° C., examples include, but are not limited to, the winter air environment in Tokyo. Such a dew point environment can be realized by a relatively simple, inexpensive air-conditioner. As the dew point environment, examples include, but are not limited to, an air-conditioner which is installed in a general plant and which uses compressed air for air conditioning. It can be said that the powder conveying system "wherein the critical temperature obtained by the judging device is from 40° C. to 55° C. when the dew point of the conveying path is from −10° C. to 10° C." is a system configured to efficiently prevent moisture adsorption to the powder during powder conveyance, by heating the conveying path at a slightly higher temperature than room temperature, in such a condition that a simple air conditioner installed in a plant is at work, for example.

The critical temperature obtained by the judging device may be from 15° C. to 30° C. when the dew point of the conveying path is from −50° C. to −30° C. The relationship between the dew point and the critical temperature depends on the powder conveyed by the powder conveying system. Accordingly, for example, when the dew point of the conveying path is from −45° C. to −35° C., the critical temperature may be from 20° C. to 25° C. When the dew point of the conveying path is −40° C., the critical temperature may be 24° C. As the moisture release behavior showing such a relationship between the dew point and the critical temperature, examples include, but are not limited to, the date of FIG. 6B that will be described below in "Examples".

As an environment at a dew point of from −50° C. to −30° C., examples include, but are not limited to, an environment in a general dry room. Of powders for battery materials, materials weak in water are often handled in an environment especially at a dew point of from −50° C. to −30° C. Accordingly, it can be said that the powder conveying system "wherein the critical temperature obtained by the judging device is from 15° C. to 30° C. when the dew point of the conveying path is from −50° C. to −30° C." is a system configured to efficiently prevent moisture adsorption to the powder during powder conveyance, by heating the conveying path at a temperature equal to or higher than room temperature in a dry room, for example.

(2) The Judging Function

The judging function of the judging device is a function to compare the temperature of the conveying path to the critical temperature and determine the next action of the system based on the comparison result. The temperature of the conveying path is measured by the measuring device with which the judging device is connected.

The temperature and dew point of the conveying path is kept by the controlling device when the temperature of the conveying path is equal to or more than the critical temperature. This is because it can be said that there is a low possibility of moisture adsorption to the powder during powder conveyance. As just described, when there is a low possibility of moisture adsorption, the system can be quitted as will be shown below in FIG. 4.

On the other hand, when the temperature of the conveying path is less than the critical temperature, at least one of heating the conveying path by the controlling device and decreasing the dew point of the conveying path by the controlling device, is carried out. This is because it can be said that there is a high possibility of moisture adsorption to the powder during powder conveyance, and there is a need to avoid moisture adsorption by quickly controlling the temperature and/or the dew point. As the method for heating the conveying path, examples include, but are not limited to, heating the conveying path by the built-in heater. As the method for decreasing the dew point of the conveying path, examples include, but are not limited to, supplying dry air by the dry air pump. Any one of the two kinds of control may be carried out; both the two kinds of control may be carried out at the same time; or the two kinds of control may be alternately carried out. After the temperature and/or the dew point is controlled in this manner, as will be shown below in FIG. 4, the temperature and dew point of the conveying path may be measured again by the measuring device.

6. Others

The powder conveying system of the disclosed embodiments may be a system connecting two containers, or it may be a system connecting the inside and outside of a container. In both cases, to minimize the possibility of moisture adsorption to the powder, the temperature and dew point of the inside of the container(s) may be measureable and controllable.

Figure 2:
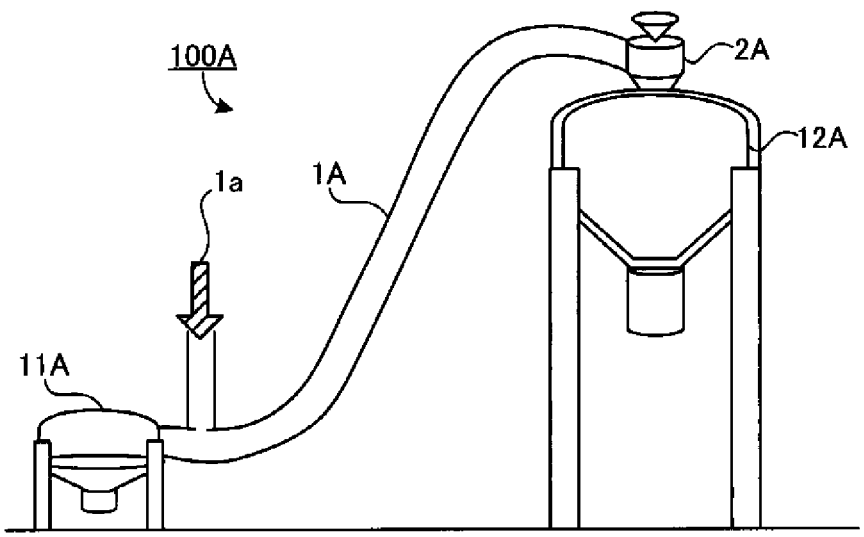
FIG. 2 is a first typical example of the powder conveying system of the disclosed embodiments, and it is also a schematic view of an embodiment using air conveyance.

FIG. 2 is a first typical example of the powder conveying system of the disclosed embodiments, and it is also a schematic view of an embodiment using air conveyance.

A first typical example 100A of the powder conveying system comprises a conveying tube 1A with a built-in heater. The conveying tube 1A with the built-in heater connects a supplying-side tank 11A and a receiving-side tank 12A, and it functions as the conveying path for conveying the powder supplied from the supplying-side tank 11A to the receiving-side tank 12A.

An air pump (not shown) serving as the conveying device is connected with one side of the conveying tube 1A with the built-in heater, the side being close to the supplying-side tank 11A, and the air pump supplies air to allow the powder to be conveyed in the direction from the supplying-side tank 11A to the receiving-side tank 12A (see the arrows 1a). A vacuum conveyor 2A serving as the conveying device is disposed at the inlet of the receiving-side tank 12A, and it suctions the powder from the conveying tube 1A with the built-in heater to store the suctioned powder in the receiving-side tank 12A.

For the conveying tube 1A with the built-in heater, the temperature of the inside of the tube can be controlled by the built-in heater (not shown). The thermometer and dew point meter (not shown) serving as the measuring device, are built into the conveying tube 1A with the built-in heater. The terminal device (not shown) serving as the judging device is connected with the heater, thermometer and dew point meter in the conveying tube 1A with the built-in heater, and the terminal device controls them.

As needed, the temperature and dew point of the air supplied by the air pump, can be controlled. For the supplying-side tank 11A and the receiving-side tank 12A, as needed, the temperature and dew point of the inside of the tanks can be controlled. As just described, by controlling the temperature and dew point of the powder source, those of the powder conveying path and those of the powder receiving site, moisture adsorption to the powder can be more efficiently prevented.

Figure 3:
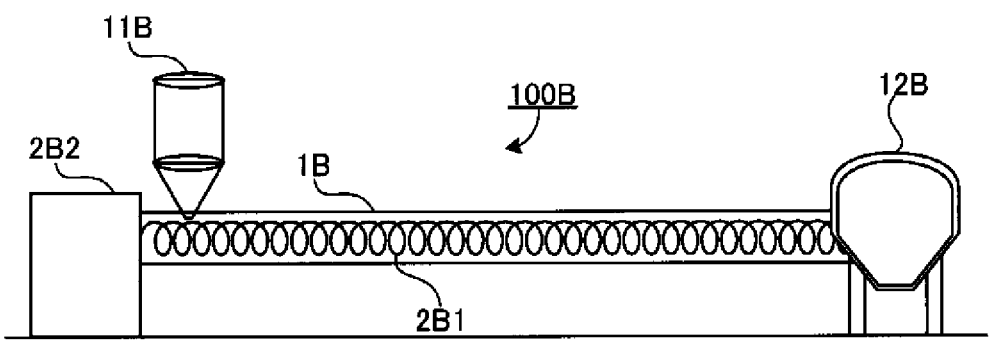
FIG. 3 is a second typical example of the powder conveying system of the disclosed embodiments, and it is also a schematic view of an embodiment using screw conveyance.

FIG. 3 is a second typical example of the powder conveying system of the disclosed embodiments, and it is also a schematic view of an embodiment using screw conveyance.

A second typical example 100B of the powder conveying system comprises a conveying tube 1B with a built-in heater, a screw conveyor 2B1 and a motor 2B2. The conveying tube 1B with the built-in heater connects a supplying-side tank 11B and a receiving-side tank 12B, and it functions as the conveying path for conveying the powder supplied from the supplying-side tank 11B to the receiving-side tank 12B.

The screw conveyor 2B1 serving as the conveying device is disposed inside the conveying tube 1B with the built-in heater and forms a part of the conveying tube 1B with the built-in heater. By the motor 2B2 serving as the conveying device, a screw in the screw conveyor 2B1 is rotated to convey the powder in the direction from the supplying-side tank 11B to the receiving-side tank 12B.

For the conveying tube 1B with the built-in heater, the temperature of the inside of the tube can be controlled by the built-in heater (not shown). The thermometer and dew point meter (not shown) serving as the measuring device and the terminal device (not shown) serving as the judging device, are the same as those of the first typical example 100A.

For the supplying-side tank 11B and the receiving-side tank 12B, as needed, the temperature and dew point of the inside of the tanks can be controlled. As just described, by controlling the temperature and dew point of the powder source, those of the powder conveying path and those of the powder receiving site, moisture adsorption to the powder can be more efficiently controlled.

Hereinafter, an example of the method for using the powder conveying system of the disclosed embodiments, will be described. The method for using the powder conveying system of the disclosed embodiments is not limited to the following example.

Figure 4:
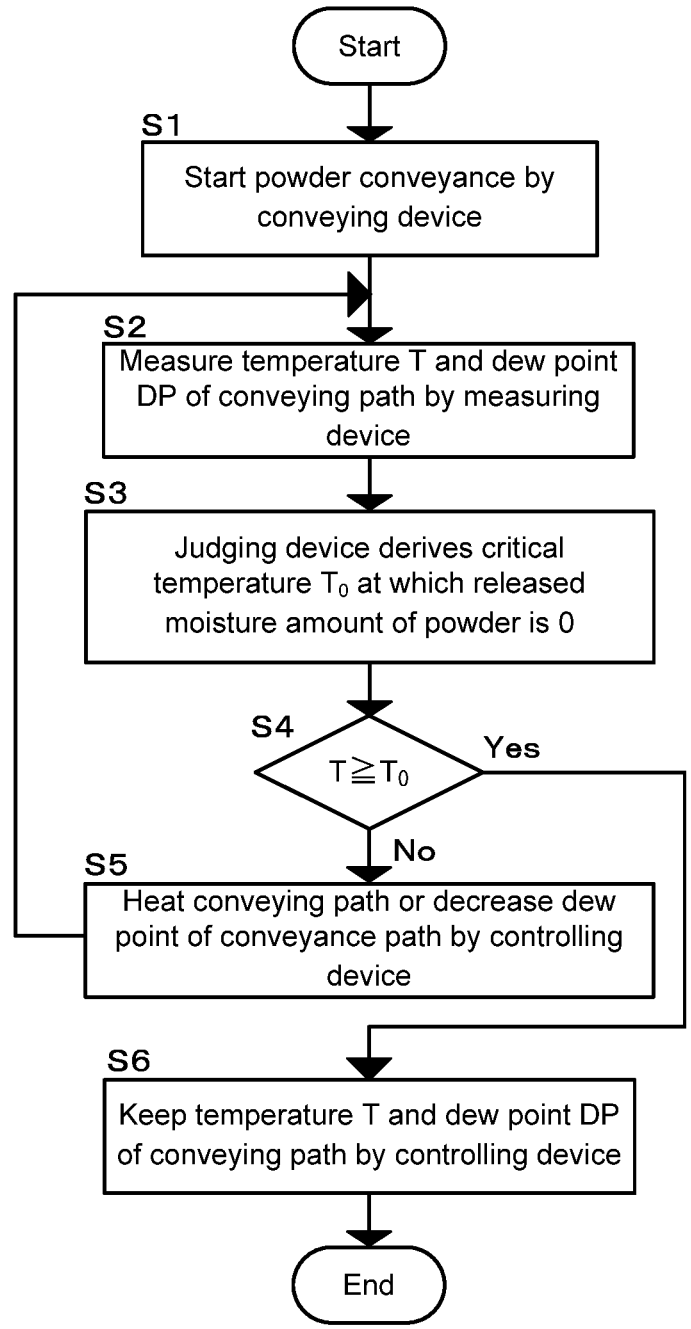
FIG. 4 is a flow chart of an example of using the powder conveying system of the disclosed embodiments.

FIG. 4 is a flow chart of an example of using the powder conveying system of the disclosed embodiments. First, powder conveyance is started by the conveying device (S1). In the case of the first typical example (FIG. 2), by operating the air pump and the vacuum conveyor 2A, the powder is passed through the conveying tube 1A with the built-in heater. In the case of the second typical example (FIG. 3), by operating the screw conveyor 2B1 and the motor 2B2, the powder is passed through the conveying tube 1B with the built-in heater.

Next, the temperature T and dew point DP of the conveying path are measured by the measuring device (S2). In the case of the first typical example (FIG. 2) and the second typical example (FIG. 3), the temperature T and dew point DP of the conveying path are measured by the thermometer and dew point meter (not shown) built into the conveying tube 1A with the built-in heater and by those built into the conveying tube 1B with the built-in heater.

Next, based on the measured dew point DP, the critical temperature $T_0$ at which the released moisture amount of the powder is 0, is derived by the judging device (S3, the critical temperature deriving function). In the case of the first typical example (FIG. 2) and the second typical example (FIG. 3), the dew point DP is input from the measuring device into the terminal device (not shown) which is an embodiment of the judging device, whereby the map of the critical temperature $T_0$ corresponding to the dew point DP, is called from the terminal device. Or, by the measuring device (not shown) which is am embodiment of the judging device, a graph of the released moisture amount of the powder with respect to the temperature at the dew point DP, is created, and the critical temperature $T_0$ is calculated. In both cases, the relationship between the released moisture amount of the powder and the temperature at the dew point DP, is unambiguously obtained by the judging device. Accordingly, the critical temperature $T_0$ is derived based on the map or graph showing the relationship.

Next, the temperature T of the conveying path measured by the measuring device, is compared to the calculated critical temperature $T_0$ by the judging device (S4, the judging function).

Next, when the temperature T of the conveying path is lower than the critical temperature $T_0$, there is a high possibility of moisture adsorption to the powder. Accordingly, the conveying path is heated by the controlling device, or the dew point of the conveying path is decreased by the controlling device (S5, the judging function). In the case of the first typical example (FIG. 2) and the second typical example (FIG. 3), the temperature of the inside of the tube is increased by the heater of the conveying tube 1A with the built-in heater. Or, in the case of the first typical example (FIG. 2), the humidity of the air supplied by the air pump (not shown) is decreased. Any one of heating the conveying path and decreasing the dew point of the conveying path may be carried out; both of them may be carried out at the same time; or they may be alternately carried out. After the control by the controlling device is finished, the temperature T and dew point DP of the conveying path are measured again by the measuring device (S2).

When the temperature T of the conveying path is higher than the critical temperature $T_0$, there is a low possibility of moisture adsorption to the powder. Accordingly, the temperature T and dew point DP of the conveying path is kept by the controlling device (S6, the judging function) and the system is quitted. Powder conveyance by the conveying device may be continued.

As described above, in the powder conveying system of the disclosed embodiments, the judging device judges whether or not to carry out heating the conveying path and/or decreasing the dew point of the conveying path, using as a reference the critical temperature at which the released moisture amount of the powder is 0. Accordingly, moisture adsorption to the powder can be efficiently prevented during powder conveyance.

EXAMPLES

Hereinafter, the disclosed embodiments will be further clarified by the following examples. The disclosed embodiments are not limited to the following examples, however.

To describe the powder conveying system of the disclosed embodiments in detail, the moisture absorption properties of a coated active material powder, which is a battery material, and the method for synthesizing the coated active material powder will be described below.

Example 1

1. Synthesis of the Coated Active Material Powder (1) Preparation of a Peroxo Complex Solution First, 987.4 g of ion-exchanged water and 44.2 g of a niobate trihydrate ($Nb_2O_5 \cdot 3H_2O$ ($Nb_2O_5$ content: 72%)) were added to 870.4 g of a hydrogen peroxide solution with a concentration of 30 mass %, thereby obtaining an aqueous solution. Next, 87.9 g of ammonia water with a concentration of 28 mass %, was added to the aqueous solution. They were sufficiently stirred to obtain a clear aqueous solution.

To the clear aqueous solution, 10.1 g of a lithium hydroxide monohydrate ($LiOH \cdot H_2O$) was added to obtain a peroxo complex solution containing lithium and a niobium complex. For the peroxo complex solution, the mol concentration of Li was 0.12 mol/kg, and the mol concentration of Nb was 0.12 mol/kg.

(2) Coating and Heating an Active Material

Using a coating equipment, 2840 g of the peroxo complex solution was sprayed to 1 kg of a cathode active material ($LiNiMnCoO_2$) to coat the cathode active material with the complex.

The operation conditions of the coating equipment were as follows.

Coating Equipment: Tumbling/Fluidizing Coating Equipment (Product Name: MP-01, Manufactured by: Powrex Corporation)
  Intake air/gas: nitrogen
  Intake air temperature: 120° C.
  Intake air flow rate: 0.4 m³/min
  Rotor rotation frequency: 400 rpm
  Spraying rate: 4.8 g/min
  Spraying time: 9.9 hours After spraying the complex solution for the above-mentioned spraying time, a mixture thus formed was removed from the coating equipment and then appropriately subjected to a post-treatment, thereby obtaining the coated active material powder of Example 1.

SEM images of the coated active material powder of Example 1 were taken at a magnification of 5000×, and the coated active material powder shown on the SEM images was observed. As a result, it was found that the coated active material powder was particles that were close to spherical. The average particle diameter of the coated active material powder of Example 1 was from about 5 μm to about 6 μm, and there were concavities and convexities on the particle surface. In a strict sense, the coated active material powder of Example 1 was secondary particles which were close to spherical and which were composed of aggregated primary particles having an average particle diameter of about 0.1 μm.

2. Calculation of Critical Temperature $T_0$

For the coated active material powder of Example 1, the moisture release behavior with respect to the temperature was measured by TPD-MS. The measurement conditions are as follows.

Measurement Equipment: Gas Chromatography Mass Spectrometer (Product Name: QP5050, Manufactured by: Shimadzu Corporation)

Figure 5:
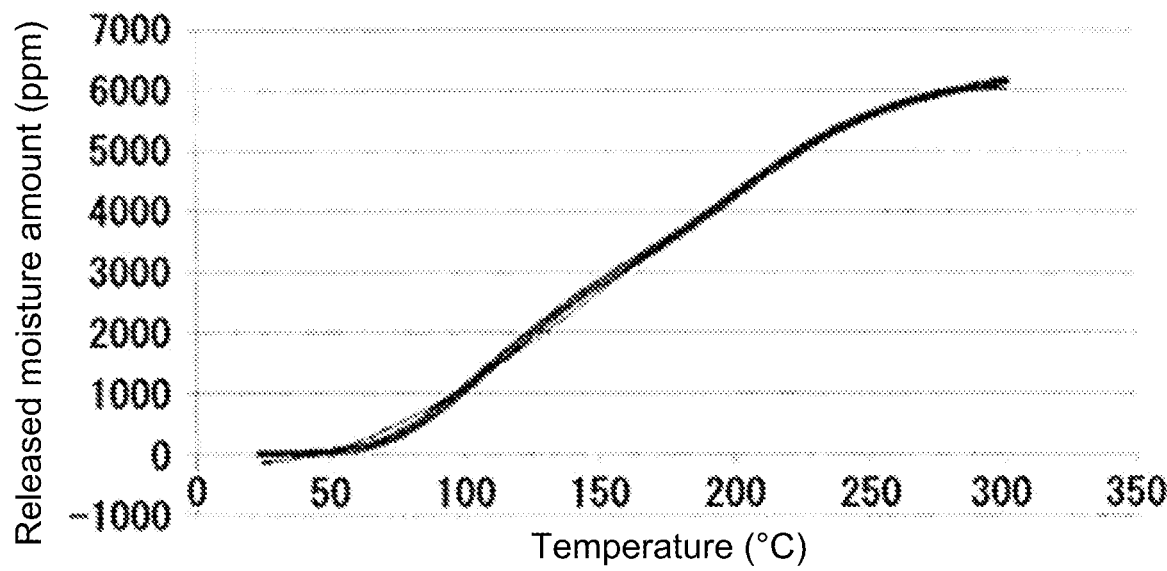
FIG. 5 is a TPD-MS curve for a coated active material powder of Example 1.

Heating Condition: Heated from Room Temperature to 300° C. at 10° C./min in a Helium Atmosphere FIG. 5 is a TPD-MS curve for the coated active material powder of Example 1. The curve shows the relationship between, for a TPD-MS spectrum obtained by the TPD-MS measurement, the temperature (the horizontal axis x in FIG. 5) and the released moisture amount (an integral value of signals at m/z=18 in the TPD-MS spectrum, the vertical axis y in FIG. 5). The TPD-MS curve is represented by the following formula (A):

$$y = -0.006x^3 + 2.8311x^2 - 110.07x - 211.6 \qquad \text{Formula (A)}$$

where x is the temperature (° C.), and y is the released moisture amount (ppm) ($R^2 = 0.9983$).

From the formula (A), it is clear that the released moisture amount of the coated active material powder of Example 1 increases with an increase in the temperature, and it is also clear that the relationship between the temperature x (° C.) and the released moisture amount y (ppm) can be approximately shown by the cubic formula. Accordingly, it is clear that in the study of the moisture release behavior of the coated active material, the critical temperature $T_0$ at which the released moisture amount of the coated active material is 0, can be obtained by showing the relationship between the temperature x (° C.) and the released moisture amount y (ppm) more approximately by the cubic formula.

Figure 6A:
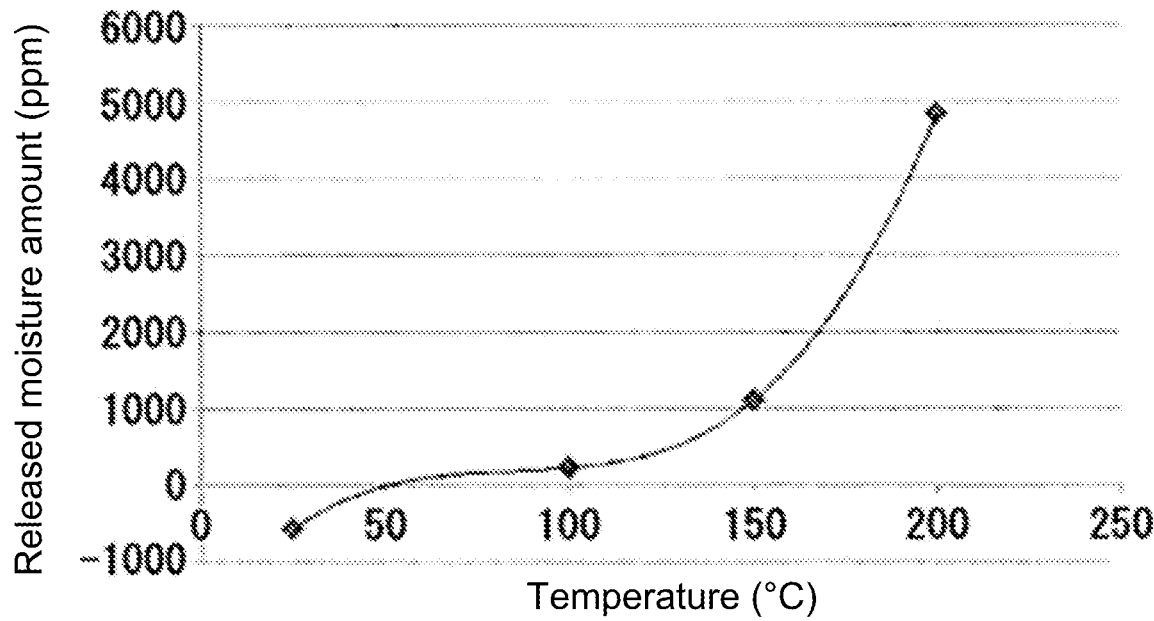
FIG. 6A is a graph showing a released moisture amount of the coated active material powder of Example 1 at a dew point of −4° C.

Next, in the condition of a dew point of −4° C., the coated active material powder of Example 1 was heated on a hot plate, and the released moisture amounts (ppm) at temperatures of 100° C., 150° C. and 200° C. were measured by a Karl Fischer water content meter (product name: AQS-22010A, manufactured by: Hiranuma Sangyo Co., Ltd.) In the condition of a dew point of −40° C., the coated active material powder of Example 1 was heated on the hot plate, and the released moisture amounts (ppm) at temperatures of 150° C., 200° C., 250° C. and 300° C. were measured by the Karl Fischer water content meter. In the condition of a dew point of −4° C. or −40° C., the released moisture amount (ppm) of the coated active material powder of Example 1 at room temperature (25° C.) was measured by the Karl Fischer water content meter. In all of the cases, the moisture amounts contained in the coated active material powder before and after it was left in the above-described dew point and temperature environments, were measured by the Karl Fischer water content meter, and the difference between the moisture amounts was defined as the released moisture amount. In FIG. 6A described below, the released moisture amount (ppm) in the environment of the dew point of −4° C. and room temperature (25° C.) is a negative value. This is because the moisture amount contained in the coated active material powder after it was left in the environment, was larger than that of the coated active material powder before it was left in the same environment.

FIG. 6A is a graph showing the released moisture amount of the coated active material powder of Example 1 at a dew point of −4° C. This graph is a curve showing the relationship between, at a dew point of −4° C., the temperature (the horizontal axis x in FIG. 6A) and the released moisture amount of the coated active material powder of Example 1 (the vertical axis y in FIG. 6A). More specifically, it is a cubic curve including Karl Fischer titration results (that is, the released moisture amounts at 25° C., 100° C., 150° C. and 200° C.) at a dew point of −4° C. This cubic curve is represented by the following formula (B1).

$$y = 0.0029x^3 - 0.7478x^2 + 65.772x - 1802.2 \qquad \text{Formula (B1)}$$

where x is the temperature (° C.) and y is the released moisture amount (ppm) ($R^2 = 1$). From FIG. 6A, it is clear that the coated active material powder of Example 1 has a tendency that the released moisture amount increases with an increase in the temperature. This tendency is the same as the above-described FIG. 5. However, as shown in FIG. 6A, it is clear that at a dew point of −4° C., less moisture is released especially in a low temperature range of 100° C. or less, and the released moisture amount rapidly increases in a high temperature range of 150° C. or more.

From FIG. 6A, it is also clear that at a dew point of −4° C., the critical temperature $T_0^{-4°C.}$ at which the released moisture amount y of the coated active material powder of Example 1 is 0, is 51.7° C.

Figure 6B:
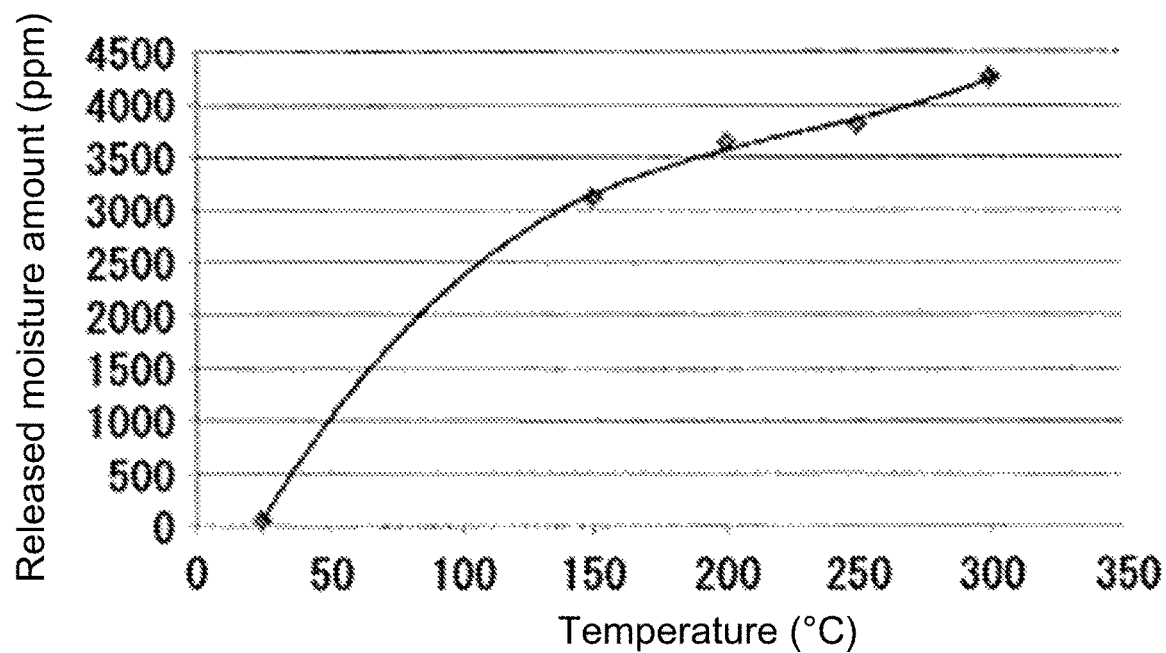
FIG. 6B is a graph showing the released moisture amount of the coated active material powder of Example 1 at a dew point of −40° C.

FIG. 6B is a graph showing the released moisture amount of the coated active material powder of Example 1 at a dew point of −40° C. This graph is a curve showing the relationship between, at a dew point of −40° C., the temperature (the horizontal axis x in FIG. 6B) and the released moisture amount of the coated active material powder of Example 1

(the vertical axis y in FIG. 6B). More specifically, it is a cubic curve including Karl Fischer titration results (that is, the released moisture amounts at 25° C., 150° C., 200° C., 250° C. and 300° C.) at a dew point of −40° C. This cubic curve is represented by the following formula (B2).

$$y=0.0003x^3-0.2025x^2+52.42x-1151.1 \quad \text{Formula (B2)}$$

where x is the temperature (° C.) and y is the released moisture amount (ppm) ($R^2$=0.9989).

From FIG. 6B, it is clear that the coated active material powder of Example 1 has a tendency that the released moisture amount increases with an increase in the temperature. This tendency is the same as the above-described FIGS. 5 and 6A. However, unlike FIG. 6A, as shown in FIG. 6B, at a dew point of −40° C., the released moisture amount is large even in a low temperature range of 100° C. or less.

From FIG. 6B, it is also clear that at a dew point of −40° C., the critical temperature $T_0^{-40°\ C.}$ at which the released moisture amount y of the coated active material powder of Example 1 is 0, is 24.1° C.

As described above, for the powder for battery materials like the coated active material powder of Example 1, it was revealed that as shown in FIGS. 6A and 6B, at each dew point, the released moisture amounts with respect to the temperatures are represented by a fitted cubic curve. From the cubic curves shown in FIGS. 6A and 6B, it was revealed that the critical temperatures $T_0^{-4°\ C.}$ and $T_0^{-40°\ C.}$ at which the released moisture amount is 0, are unambiguously obtained. From these results, it was revealed that the judging device of the powder conveying system of the disclosed embodiments stores, as a map, the relationship between each dew point and the critical temperature $T_0$ corresponding thereto, whereby the critical temperature at which the released moisture amount of the powder is 0, is obtained based on the dew point of the conveying path.

REFERENCE SIGNS LIST 1A, 1B. Conveying tube with a built-in heater
1a. Arrow showing a powder conveying direction
2A. Vacuum conveyor
2B1. Screw conveyor
2B2. Motor
11A, 11B. Supplying-side tank
12A, 12B. Receiving-side tank
100A. First typical example of a powder conveying system
100B. Second typical example of a powder conveying system

The invention claimed is:

1. A powder conveying system comprising:
a conveying path,
a conveying device wherein the conveying device is a part of the conveying path or is connected with the conveying path, and the conveying device is configured to convey a powder in the conveying path;
a measuring device wherein the measuring device is a part of the conveying path or is connected with the conveying path, and the measuring device is configured to measure a temperature and dew point of the conveying path;
a controlling device wherein the controlling device is a part of the conveying path or is connected with the conveying path, and the controlling device is configured to control at least one of the temperature and dew point of the conveying path; and
a judging device wherein the judging device is connected with the measuring device and the controlling device; the judging device is configured to obtain, based on the dew point of the conveying path measured by the measuring device, a critical temperature at which a released moisture amount of the powder is 0; the judging device is configured to compare the temperature of the conveying path measured by the measuring device to the critical temperature; the judging device is configured to keep the temperature and dew point of the conveying path by the controlling device when the temperature of the conveying path is equal to or more than the critical temperature; and the judging device is configured to carry out at least one of heating the conveying path by the controlling device and decreasing the dew point of the conveying path by the controlling device, when the temperature of the conveying path is less than the critical temperature.

2. The powder conveying system according to claim 1, wherein the critical temperature obtained by the judging device is from 40° C. to 55° C. when the dew point of the conveying path is from −10° C. to 10° C.

3. The powder conveying system according to claim 1, wherein the critical temperature obtained by the judging device is from 15° C. to 30° C. when the dew point of the conveying path is from −50° C. to −30° C.

4. The powder conveying system according to claim 1, wherein the powder is a powder for battery materials.

* * * * *